(12) United States Patent
Hui et al.

(10) Patent No.: US 10,681,608 B2
(45) Date of Patent: Jun. 9, 2020

(54) TRAFFIC CLASS CAPACITY ALLOCATION IN COMPUTER NETWORKS

(71) Applicant: Cisco Technology, Inc., San Jose, CA (US)

(72) Inventors: Jonathan W. Hui, Belmont, CA (US); Jean-Philippe Vasseur, Saint Martin D'uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 26 days.

(21) Appl. No.: 16/021,721

(22) Filed: Jun. 28, 2018

(65) Prior Publication Data

US 2018/0310222 A1 Oct. 25, 2018

Related U.S. Application Data

(62) Division of application No. 14/559,148, filed on Dec. 3, 2014, now Pat. No. 10,039,046.

(60) Provisional application No. 62/027,043, filed on Jul. 21, 2014.

(51) Int. Cl.
*H04W 40/04* (2009.01)
*H04W 72/08* (2009.01)
*H04L 12/24* (2006.01)
*H04L 12/863* (2013.01)
*H04L 12/851* (2013.01)
*H04W 72/04* (2009.01)

(52) U.S. Cl.
CPC ......... *H04W 40/04* (2013.01); *H04L 41/5022* (2013.01); *H04L 47/2408* (2013.01); *H04L 47/621* (2013.01); *H04W 72/08* (2013.01); *H04W 72/0453* (2013.01)

(58) Field of Classification Search
CPC . H04W 40/04; H04W 72/08; H04W 72/0453; H04L 47/621; H04L 47/2408; H04L 41/5022
See application file for complete search history.

(56) References Cited

U.S. PATENT DOCUMENTS 8,948,229 B2 2/2015 Hui et al.
2002/0174246 A1 11/2002 Tanay et al.
(Continued)

OTHER PUBLICATIONS

Gnawali et al., "The Minimum Rank with Hysteresis Objective Function", Request for Comments 6719, Sep. 2012, 13 pages, Internet Engineering Task Force Trust.
(Continued)

*Primary Examiner* — Walter J Divito
(74) *Attorney, Agent, or Firm* — Behmke Innovation Group LLC; James M. Behmke; Jonathon P. Western

(57) ABSTRACT

In one embodiment, a device in a network identifies one or more traffic classes used by one or more nodes in the network. The device determines routing requirements for a particular traffic class of the one or more traffic classes. The device generates a channel assignment that assigns the particular traffic class to a particular channel based on the routing requirements for the particular traffic class. The device provides the channel assignment to the one or more nodes. The one or more nodes use the channel assignment to route traffic of the particular traffic class within the network.

18 Claims, 16 Drawing Sheets

(56) References Cited

U.S. PATENT DOCUMENTS

| | | | |
|---|---|---|---|
| 2003/0210665 A1* | 11/2003 | Salmenkaita | H04W 72/082 |
| | | | 370/330 |
| 2006/0067283 A1 | 3/2006 | So et al. | |
| 2006/0159020 A1 | 7/2006 | Porat | |
| 2007/0211746 A1* | 9/2007 | Oshikiri | G06F 13/4022 |
| | | | 370/437 |
| 2009/0198832 A1 | 8/2009 | Shah et al. | |
| 2010/0120418 A1 | 5/2010 | Agarwal | |
| 2011/0314145 A1 | 12/2011 | Raleigh et al. | |
| 2014/0204823 A1* | 7/2014 | Merlin | H04W 72/005 |
| | | | 370/312 |
| 2014/0376361 A1 | 12/2014 | Hui et al. | |
| 2015/0379670 A1* | 12/2015 | Koker | G06T 1/20 |
| | | | 345/502 |

OTHER PUBLICATIONS

Thubert P., "Objective Function Zero for the Routing Protocol for Low-Power and Lossy Networks (RPL)", Request for Comments 6552, Mar. 2012, 14 pages, Internet Engineering Task Force Trust.
Vasseur et al., "Routing Metrics Used for Path Calculation in Low-Power and Lossy Networks", Request for Comments 6551, Mar. 2012, 30 pages, Internet Engineering Task Force Trust.
Minter et al., "RPL: IPv6 Routing Protocol for Low-Power and Lossy Networks", Request for Comments 6550, Mar. 2012, 157 pages, Internet Engineering Task Force Trust.

* cited by examiner

TRAFFIC CLASS CAPACITY ALLOCATION IN COMPUTER NETWORKS

RELATED APPLICATIONS

This application is a Divisional Application of U.S. patent application Ser. No. 14/559,148, filed Dec. 3, 2014, which claims priority to U.S. Provisional Application No. 62/027,043, filed Jul. 21, 2014, entitled: "TRAFFIC CLASS CAPACITY ALLOCATION IN COMPUTER NETWORKS," by Hui et al., the contents of which are herein incorporated by reference.

TECHNICAL FIELD

The present disclosure relates generally to computer networks, and, more particularly, to traffic class capacity allocation in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
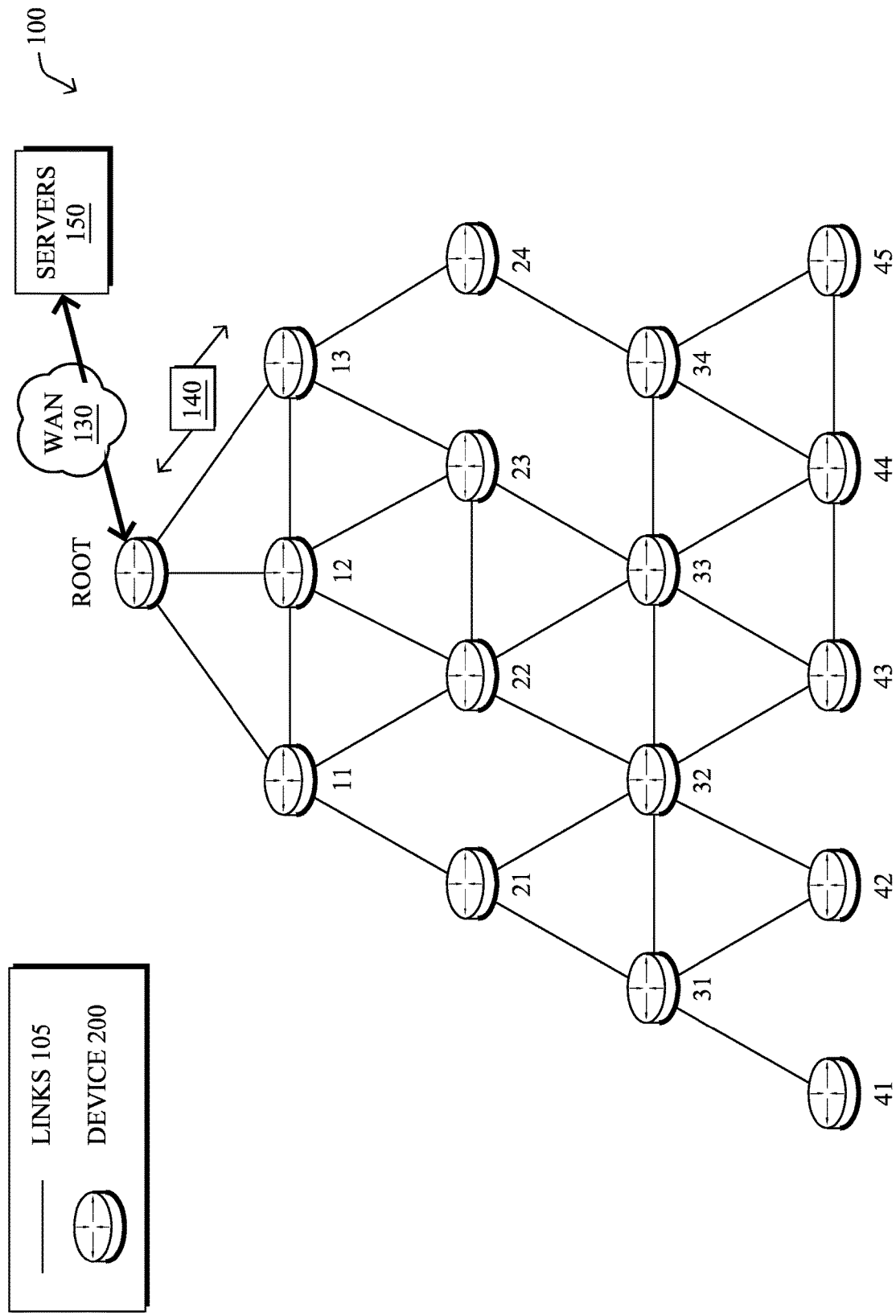
FIG. 1 illustrates an example communication network.

According to one or more embodiments of the disclosure, a device in a network identifies one or more traffic classes used by one or more nodes in the network. The device determines routing requirements for a particular traffic class of the one or more traffic classes. The device generates a channel assignment that assigns the particular traffic class to a particular channel based on the routing requirements for the particular traffic class. The device provides the channel assignment to the one or more nodes. The one or more nodes use the channel assignment to route traffic of the particular traffic class within the network.

In further embodiments, a node in a network receives a channel assignment for a particular traffic class that assigns the particular traffic class to a particular channel. The node identifies one or more channel hopping schedules to communicate with one or more neighbors of the node. The node identifies a traffic class of traffic to be sent by the node as matching the particular traffic class. The node sends the traffic to a particular neighbor in the one or more neighbors via a channel of the one or more channel hopping schedules. The channel of the one or more channel hopping schedules is selected based on the traffic class of the traffic to be sent and on the channel assignment for the particular traffic class.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
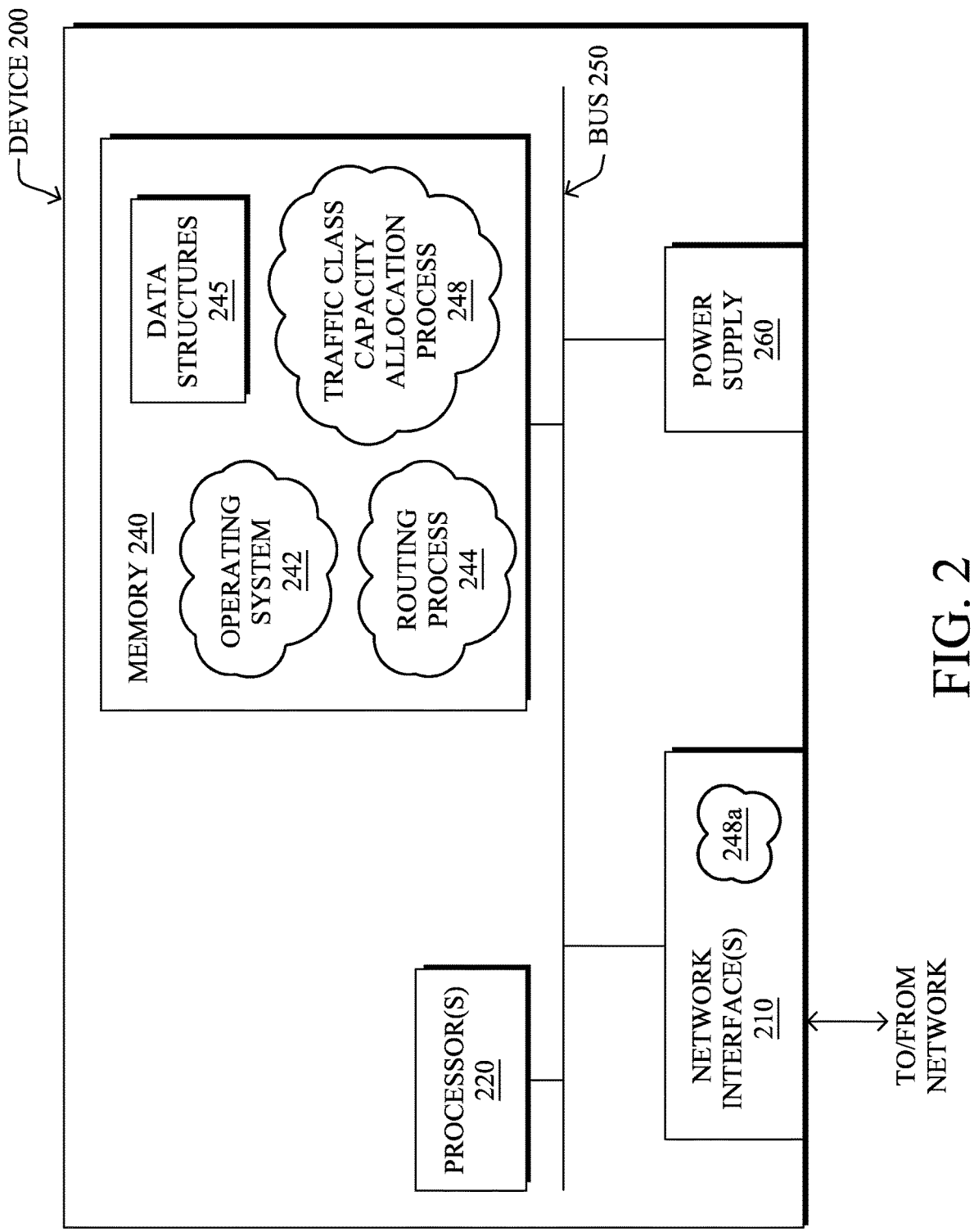
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "traffic class capacity allocation" process 248, which may be configured depending upon the particular node/device within the network 100 with functionality ranging from intelligent learning machine processes to merely communicating with intelligent learning machines, as described herein. Note also that while the traffic class capacity allocation process 248 is shown in centralized memory 240, alternative embodiments provide for the process to be specifically operated within the network interfaces 210 (e.g., "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
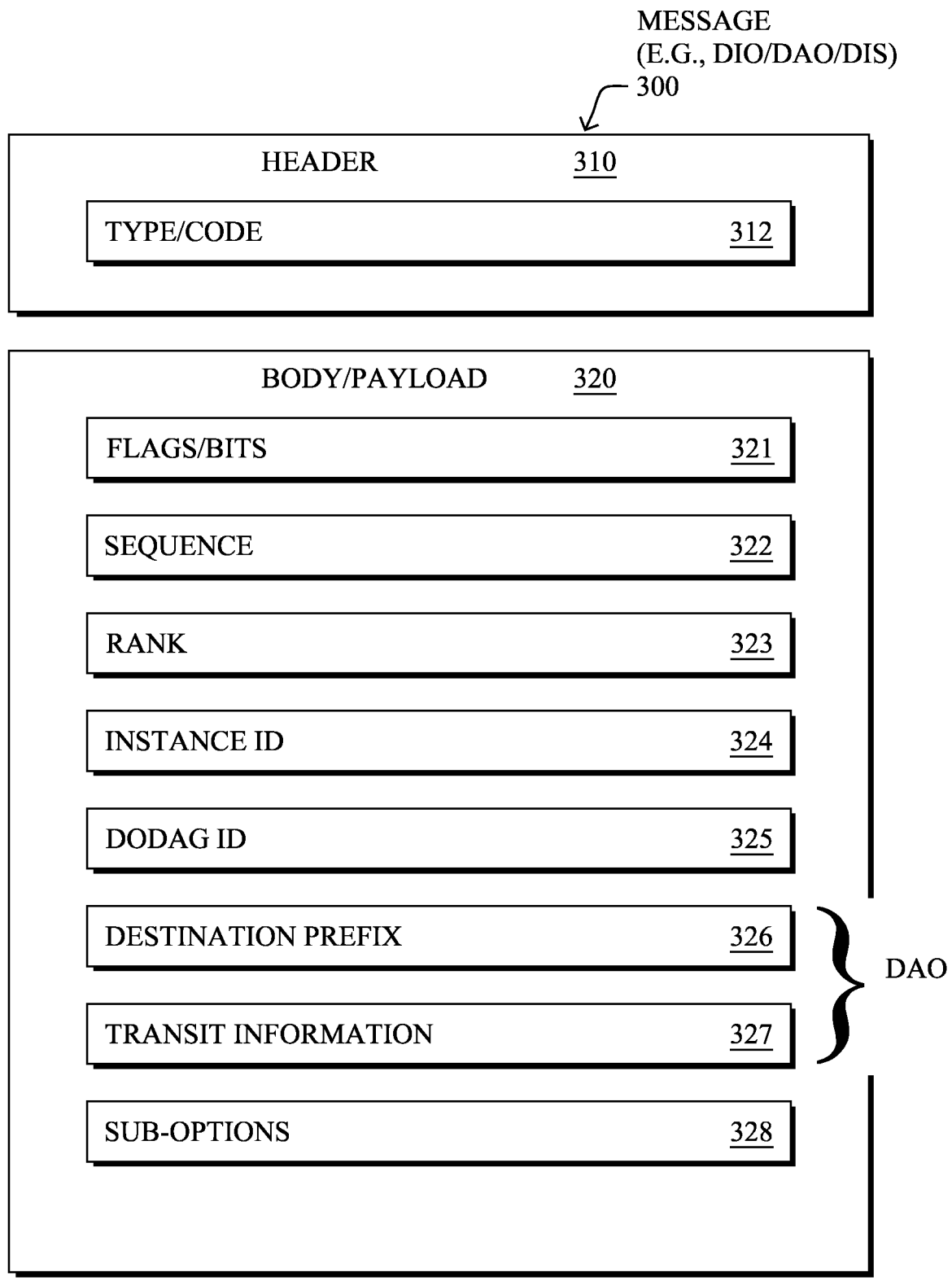
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
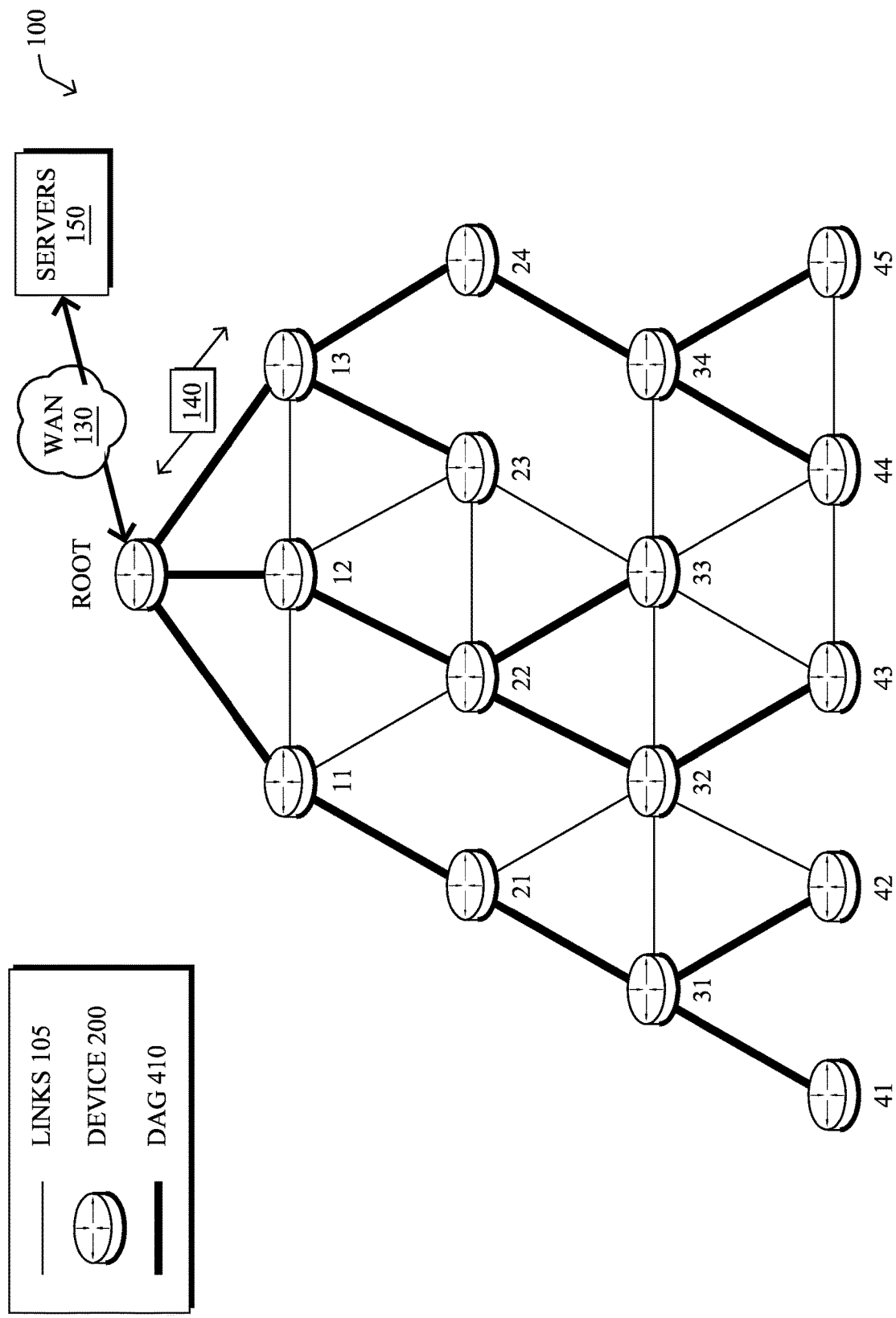
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Moreover, in many cases, LLN devices communicate using a frequency-hopping, or channel-hopping, link layer (the terms "frequency" and "channel" may be used interchangeably herein). This approach may be driven both by regulatory compliance and the fact that channel-hopping systems offer better spectral efficiency. Frequency-hopping, also referred to as "frequency-hopping spread spectrum" (FHSS), is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 5:
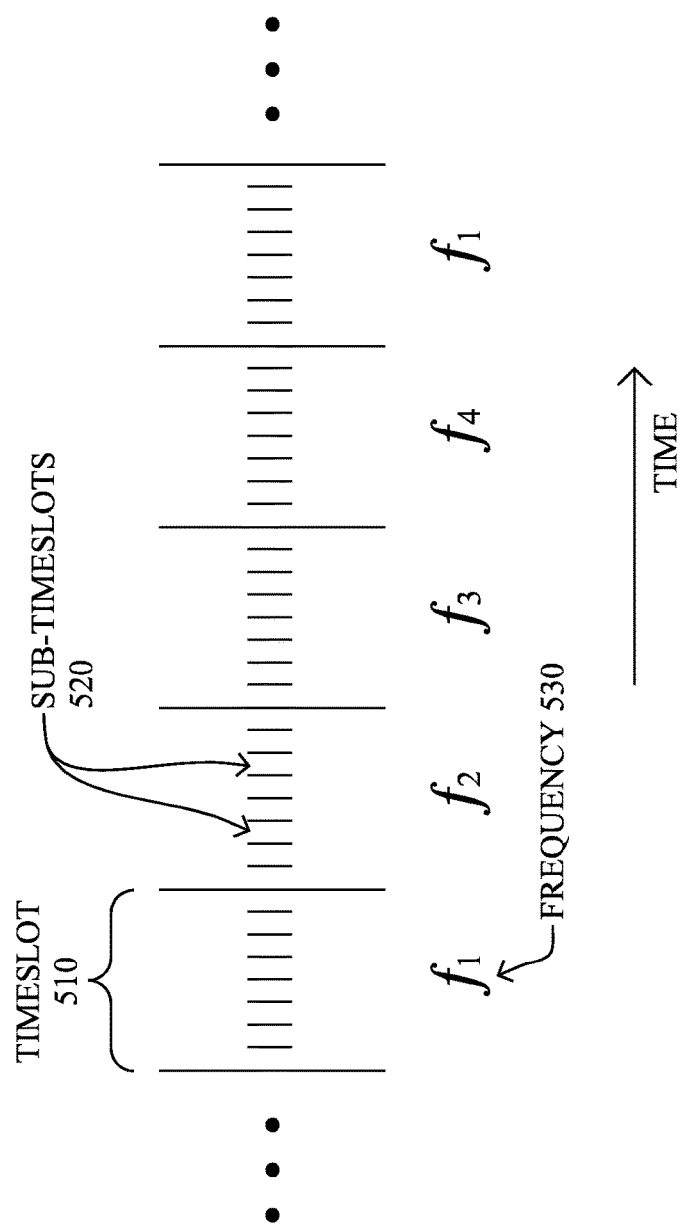
FIG. 5 illustrates an example channel-hopping sequence.

In general, as shown in FIG. 5, in frequency-hopping wireless networks, time frames are divided within a frequency-hopping sequence 500 into regular timeslots 510, each one operating on a different frequency 530 (e.g., $f_1$-$f_4$). A reference clock may be provided for the time frames for an entire network (e.g., mesh/cell), or at least between pairs of communicating devices. A MAC layer (of network interface 210) of each node 200 divides time into timeslots that are aligned with the timeslot boundary of its neighbor. Also, each timeslot 510 may be further divided into sub-timeslots 520. (Note that not all frequency-hopping systems use sub-timeslots, and devices can begin transmission at any time within a timeslot; the view herein is merely one example.) Illustratively, the MAC layer is in charge of scheduling the timeslot in which a packet is sent, the main objective of which generally being randomization of the transmission time in order to avoid collisions with neighbors' packets. Note that the MAC layer must not only schedule the data messages coming from upper layers of a protocol stack, but it also must schedule its own packets (e.g., acknowledgements, requests, beacons, etc.).

A device in the frequency-hopping network configures its receiver to follow a hopping schedule by picking a channel/frequency sequence, duration of each timeslot, and time base that defines when the first slot in the schedule begins. To then communicate a packet, the transmitter and receiver must be configured to the same channel/frequency during the packet transmission, i.e., synchronized. All devices in a given network may utilize the same hopping schedule (i.e., all devices are configured to use the same channel sequence, time slot duration, and a common time base), resulting in a network where all communication in the network at any given point in time utilizes the same channel. Alternatively, each transmitter-receiver pair may utilize different hopping schedules (i.e., each pair may differ in channel sequence, time slot duration, and/or time base), such that transmitter-receiver pairs may communicate at the same time but on different channels. Moreover, timeslots between different devices can, in fact, be out-of-phase, and may have no relationship with each other. The latter approach may be preferable, at times, as it can add to the overall robustness and versatility of the communication network.

Figure 6:
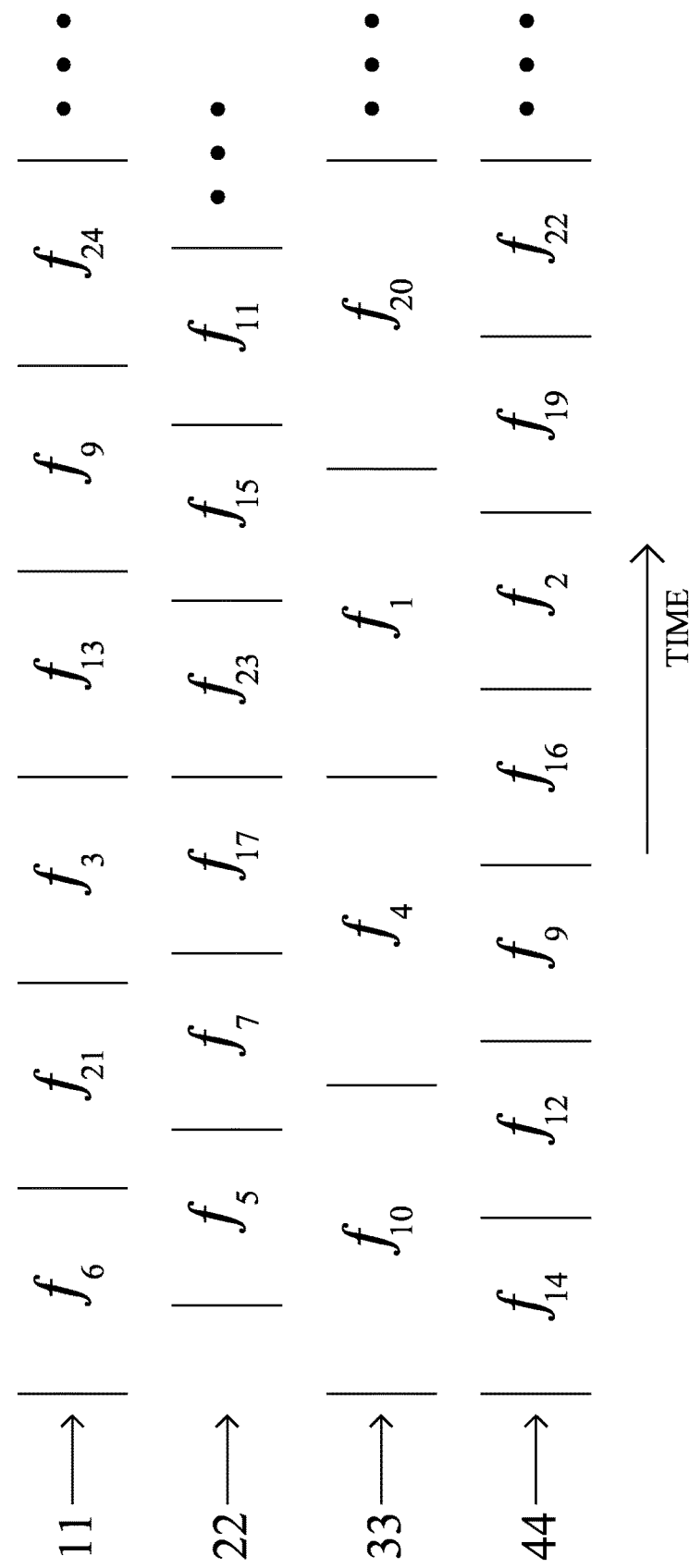
FIG. 6 illustrates example independently determined and independently timed channel-hopping sequences.

FIG. 6 illustrates an example of independently determined local unicast listening schedules 600 that may be independently computed by each individual device, "11," "22," "33," and "44," respectively. A device synchronizes its listening, or "hopping," schedule with another device by communicating its channel sequence, time slot duration, and current time within the schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time. However, it is possible that devices may not know the addresses of neighboring devices. Therefore, link-layer broadcast communication may be necessary, as it does not require any synchronization to communicate with neighboring devices. For example, IEEE 802.15.4 Enhanced Beacon Requests (EBRs) and Enhanced Beacons (EBs) are used by devices to discover neighboring networks. This type of broadcast communication is considered "asynchronous," since the network devices are not synchronized to a common channel schedule.

Different types of traffic may be routed within an LLN. In general, a traffic class may be defined by a particular application, sender address, and/or destination address. For example, many Smart Grid AMI mesh networks support a multi-service architecture that is capable of providing network connectivity for multiple applications. These applications may include, but are not limited to, Automated Meter Reading (AMR), Demand Response (DR), Outage Detection and Restoration, Distribution Automation (DA), among others, each of which may have an associated traffic class. To support the different services, some Smart Grid AMI networks use carrier sense multiple access with collision avoidance (CSMA/CA) as the enabling wireless technology for communication in the network.

Traffic associated with different applications may occur at different times. For example, AMR traffic may be relatively predictable, as meter readings are typically provided periodically. However, other applications may have more unpredictable traffic flows. For example, on-demand meter reads, demand-response messages, outage detection and restoration functions, DA control, and the like, typically generate traffic in response to external events, as opposed to a periodic timer. In DA applications, in particular, channel access may be imperative, to allow the automation process to operate correctly. In addition, certain paths in the network may be required to support bounded delays, thereby guaranteeing a time window in which a message will be received.

A challenge with CSMA/CA is prioritizing access to a shared medium based on the priority of a packet. In particular, the challenge is how one device with a high priority packet is given access to the media before another device with a low priority packet. Existing CSMA-based mechanisms operate by adjusting backoff durations (e.g., by giving higher priority packets shorter backoff periods). However, such a mechanism has limited effectiveness in mesh networks due to the hidden-terminal problem. In particular, since each device maintains its own channel-hopping schedule, it is possible that a node A is attempting to transmit to node B at the same time that node B is attempting to communicate with node C (e.g., since node A does not have access to node C's schedule). Thus, some techniques attempt to control the timing of transmissions by determining the devices' schedules centrally. For example, some implementations may use Time and/or Frequency Division Multiple Access (TDMA/FDMA), which effectively allocate different time and frequency domains centrally for different users or traffic classes. Time-Synchronized Channel Hopping (TSCH) is another approach that uses TDMA and FDMA to allocate capacity to specific flows. However, TSCH also assumes that flows are fairly predictable, which may not be the case with certain applications.

Traffic Class Capacity Allocation in Computer Networks

The techniques herein provide a mechanism for dynamic and interleaving traffic class capacity allocation in LLNs that employ a distributed architecture (e.g., where every device defines its own channel-hopping schedule) and/or employ a full mesh configuration (e.g., where devices typically have multiple next-hop routes towards each destination). The techniques herein dynamically allocate portions of available spectrum to different traffic classes across an entire network. While the spectrum allocation is network-wide, the distributed mesh architecture of the network minimizes the increase in delay by combining fast re-route techniques with FDMA in a distributed mesh network.

In particular, the techniques herein provide a method for allocating traffic class capacity without significantly affecting communication delay in an LLN, such as a Smart Grid AMI mesh network. In one aspect, sets of channels may be allocated to different traffic classes across neighboring devices or an entire mesh network. In another aspect, mesh devices may provide information about channel/link quality (e.g. noise floor metrics, etc.), to assist in assigning channel sets to traffic classes. In yet another aspect, mesh devices may maintain multiple next-hop routes and choose a specific next-hop destination based on the packet's traffic class and the receiver's channel hopping schedule. In a further aspect, the techniques herein allow a device to transmit a packet using a channel assigned to lower-priority traffic classes when no higher-priority channels are currently available. In an additional aspect, a device may iteratively adjust the channel set assignments to different traffic classes based on collected feedback from the network devices (e.g., channel utilization, etc.). In yet another aspect, a device that assigns traffic classes to channels may provide feedback to an NMS when a change in a channel allocation is not achievable.

Illustratively, the techniques described herein may be performed by hardware, software, and/or firmware, such as in accordance with the "traffic class capacity allocation" process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as various routing protocols (e.g., RPL), and as such, may be processed by similar components understood in the art that execute those protocols, accordingly.

Specifically, in various embodiments, a device in a network identifies one or more traffic classes used by one or more nodes in the network. The device determines routing requirements for a particular traffic class of the one or more traffic classes. The device generates a channel assignment that assigns the particular traffic class to a particular channel based on the routing requirements for the particular traffic class. The device provides the channel assignment to the one or more nodes. The one or more nodes use the channel assignment to route traffic of the particular traffic class within the network.

Operationally, the techniques herein assign/allocate channels (e.g., frequencies) across groups of adjacent devices or an entire network for use with different traffic classes. Notably, as described above, a network may use a fully distributed channel hopping architecture whereby each device defines its own channel hopping receive schedule. In particular, when combining channel allocations to traffic classes with fast re-route mechanisms in a full mesh environment, it is possible to realize the flexibility of CSMA with the effective capacity allocation of TDMA/FDMA. This is made possible because a distributed channel hopping architecture naturally provides an interleaving set of schedules.

Figure 7A:
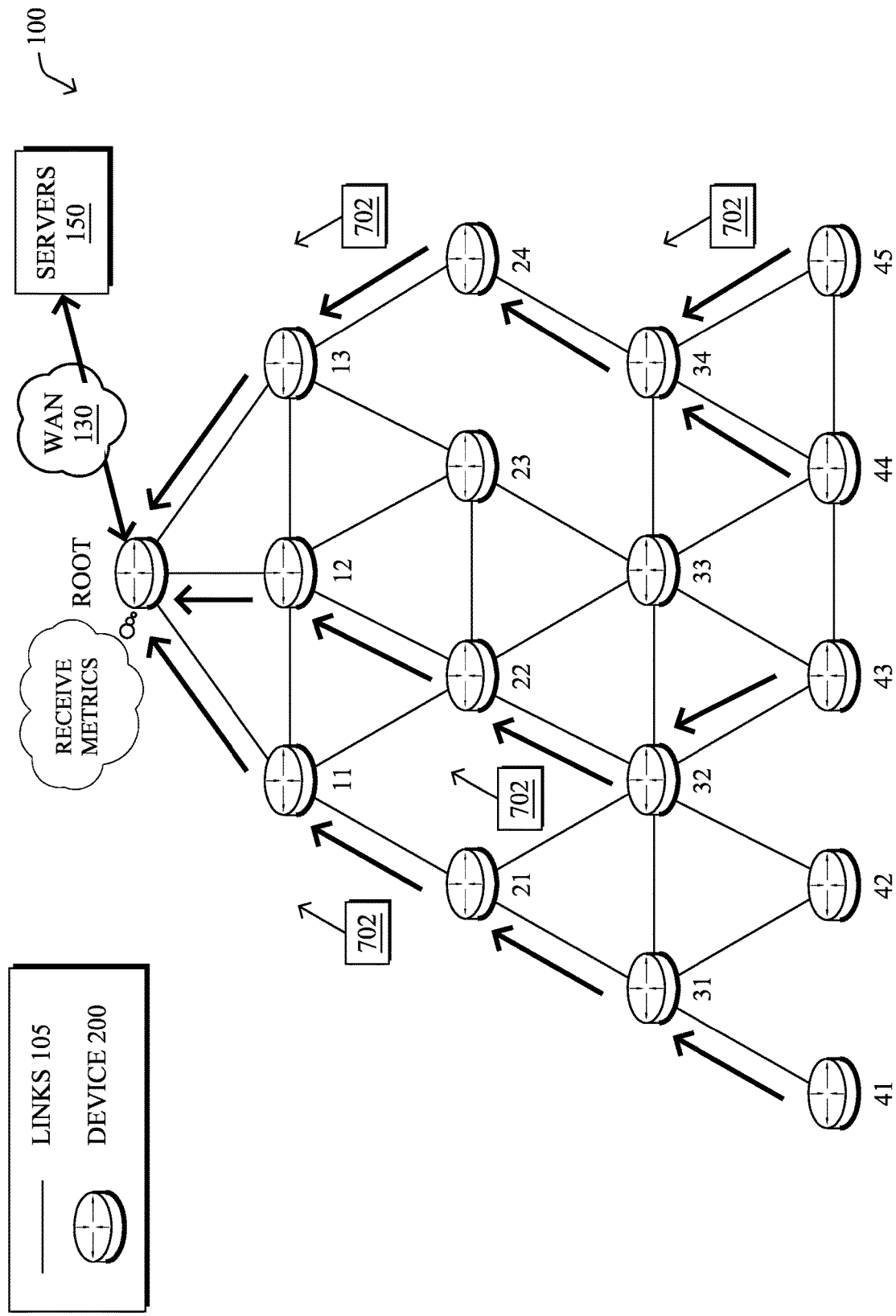
FIGS. 7A-7B illustrate an example of traffic classes being assigned to channels.
Figure 7B:
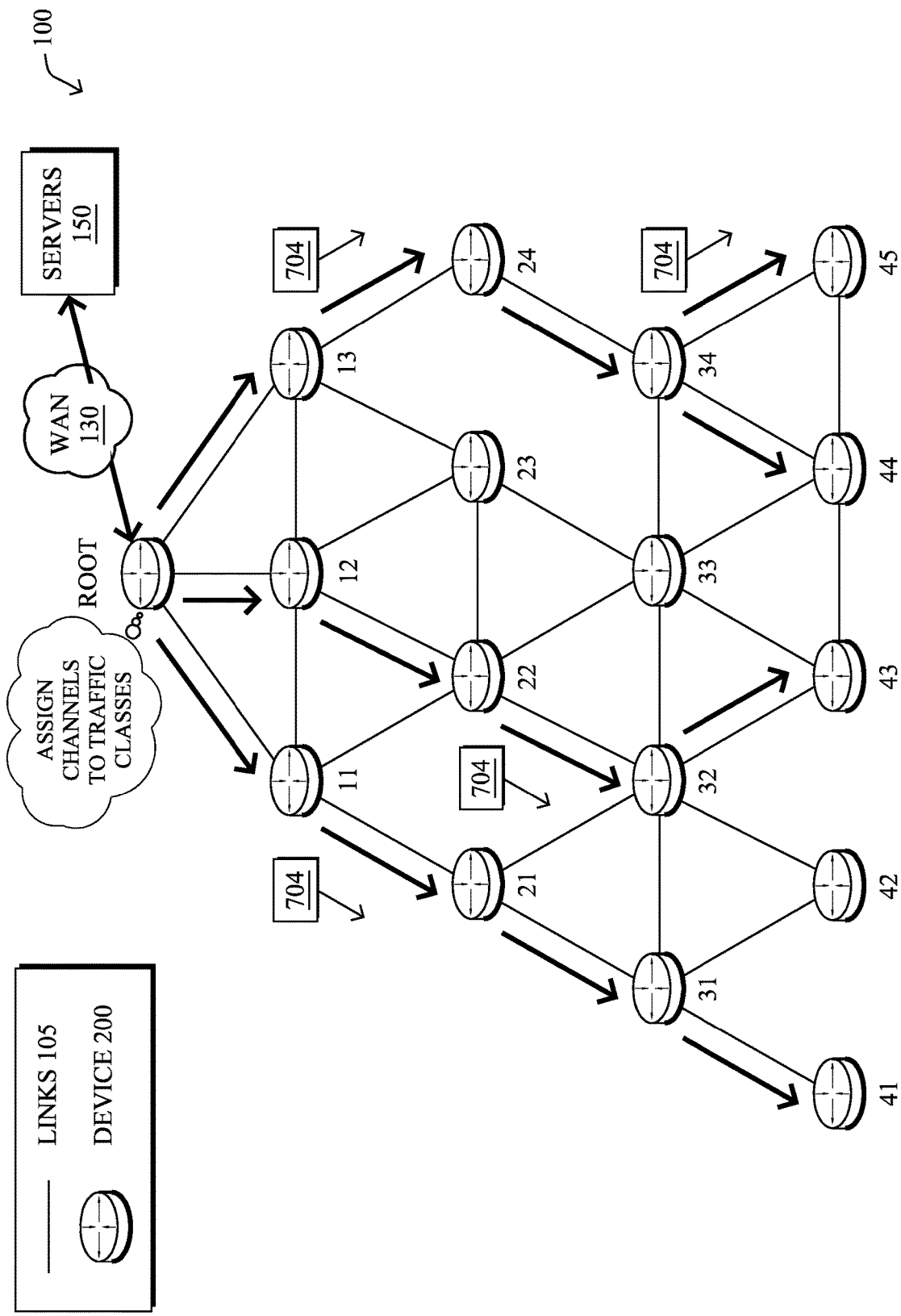

Referring now to FIGS. 7A-7B, an example of traffic classes being assigned to channels is illustrated, according to various embodiments. In some embodiments, a supervisory device such as a FAR/Root, NMS, etc. may collect information from the network that can be used when allocating sets of channels to various traffic classes. For example, as shown, the nodes in network 100 may provide channel/link metrics 702 to the supervisory device. In one embodiment, metrics 702 may include link quality indicators for some or all channels used by a device to communicate with its neighbor(s). For example, metrics 702 may include received signal strength indicator (RSSI) information, link quality indicator (LQI) information, expected transmission count (ETX) information, or the like, to denote the quality of a link using a particular channel/frequency. In another embodiment, metrics 702 may indicate a noise floor for some or all of the channels used by the nodes.

In general, the supervisory device may be operable to identify channels that generally perform better across an entire network for use with higher priority traffic classes. For this reason, high-resolution and high-frequency data collection via metrics 702 may not provide much value since characteristics that typically involve a large geographic area also typically have a large time constant. For example, sending tens of bytes four times a day may be sufficient in some networks, for purposes of allocating channels to traffic classes. Accordingly, in some implementations, metrics 702 may provide only low-resolution regarding links 105 and/or the channels used across links 105. For example, metrics 702 may be as small as a single bit that simply indicates whether a link quality metrics (e.g., RSSI, EXT, etc.) is good or bad (e.g., based on a comparison with a threshold value) and reported at a low frequency (e.g., with a relatively large amount of time between reports), in one embodiment. In another embodiment, metrics 702 may identify the X % of channels available to each node, where X is a configurable parameter.

As shown in FIG. 7B, the supervisory device may be configured to assign sets of channels (frequencies) to various traffic classes. In various embodiments, the channel assignments may be based in part on the metrics 702 received from the network nodes. For example, the supervisory device may choose to assign channels that experience less noise or higher link quality to higher priority traffic classes (e.g., DA traffic, etc.). The supervisory device may also base channel assignments on any service level agreements (SLAs) associated with a given traffic class. In other cases, the supervisory device may assign certain channels to a particular traffic class to support an expected available bandwidth for the traffic class.

The basic form of the techniques herein involves specifying the same allocations/assignments across all nodes managed by the supervisory device (e.g., up to 5000 nodes in typical LLN deployments). Because the channel assignments are uniform to all devices under the supervisory device, the supervisory device may seek to generate channel assignments that offer the best fit across all of the nodes. Notably, one important property for highly critical traffic is the available bandwidth. Thus, in one embodiment, the supervisory device may start with channel assignments that provide bandwidth capacities equal to the bandwidths required by the applications and their traffic priorities. Feedback on channel conditions (e.g., via metrics 702) may indicate that constant narrowband interference is affecting a portion of channels, and the supervisory device may use this information to avoid using channels experiencing interference for high-priority traffic.

After generating the channel assignments for the traffic classes, the supervisory device may send instructions 704 to the various nodes, thereby informing the nodes of the channel assignments for the traffic classes. In one embodiment, the set of channels allocated to a given traffic class may be done deployment wide (e.g., the FAR/Root may send instructions 704 to all of nodes 11-45). In another embodiment, the set of channels allocated to a given traffic class may be done on a smaller group of devices. However, to be effective, the allocation should be applied to devices that are within the same interference domain so that hidden-terminal effects do not cause collisions between different traffic classes. In various embodiments, instructions 704 may encode a bit mask of channels, the range(s) of channels, or a list of channels, to notify a node about the channel assignments. Further, instructions 704 may be sent using any form of multicast communication already used in the network (e.g., within Information Elements via IEEE 802.15.4 Enhanced Beacons, CSMP via IPv6 Multicast, etc.), in one embodiment.

Figure 8A:
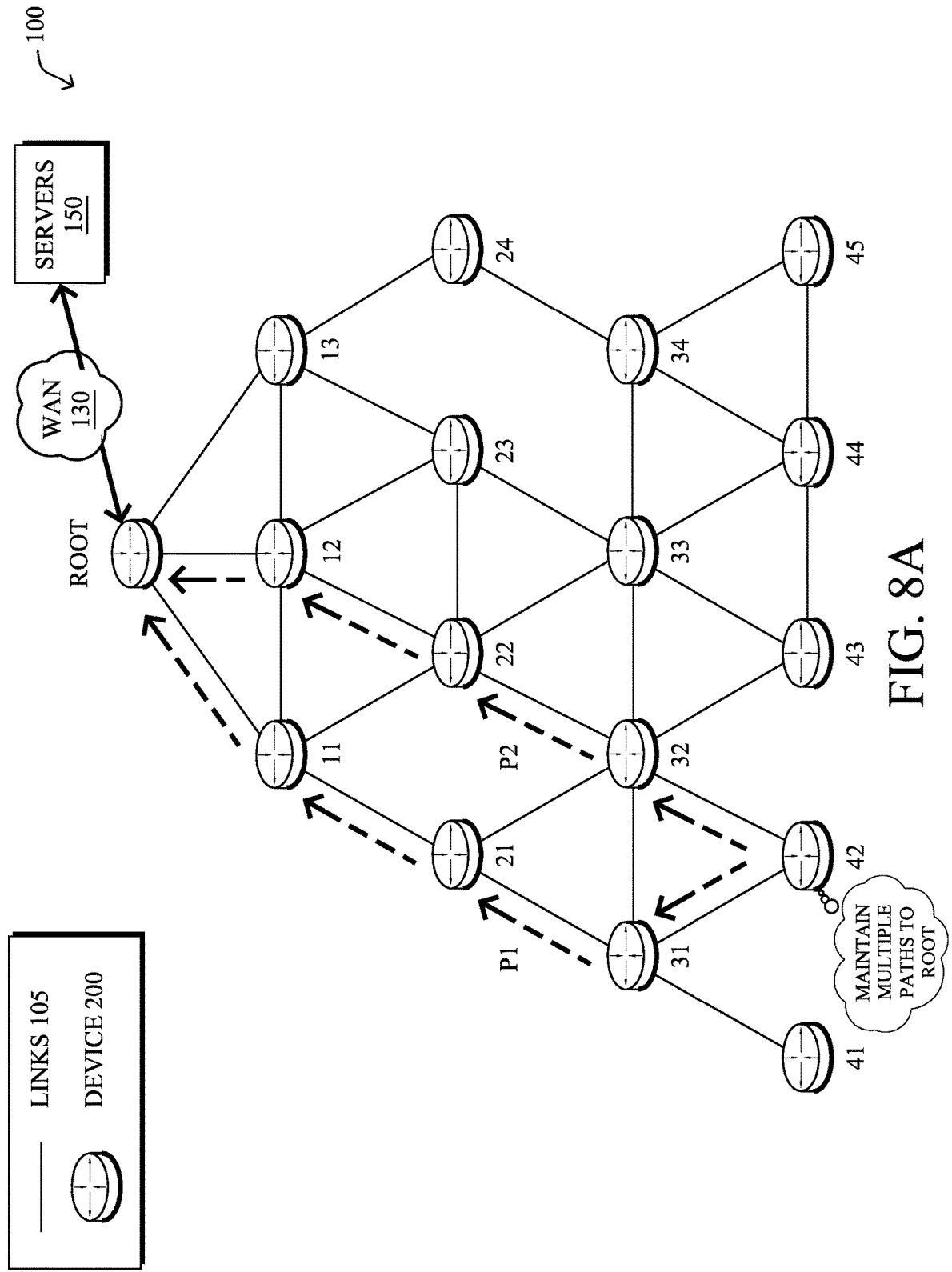
FIGS. 8A-8B illustrate an example of a node making a routing decision.
Figure 8B:
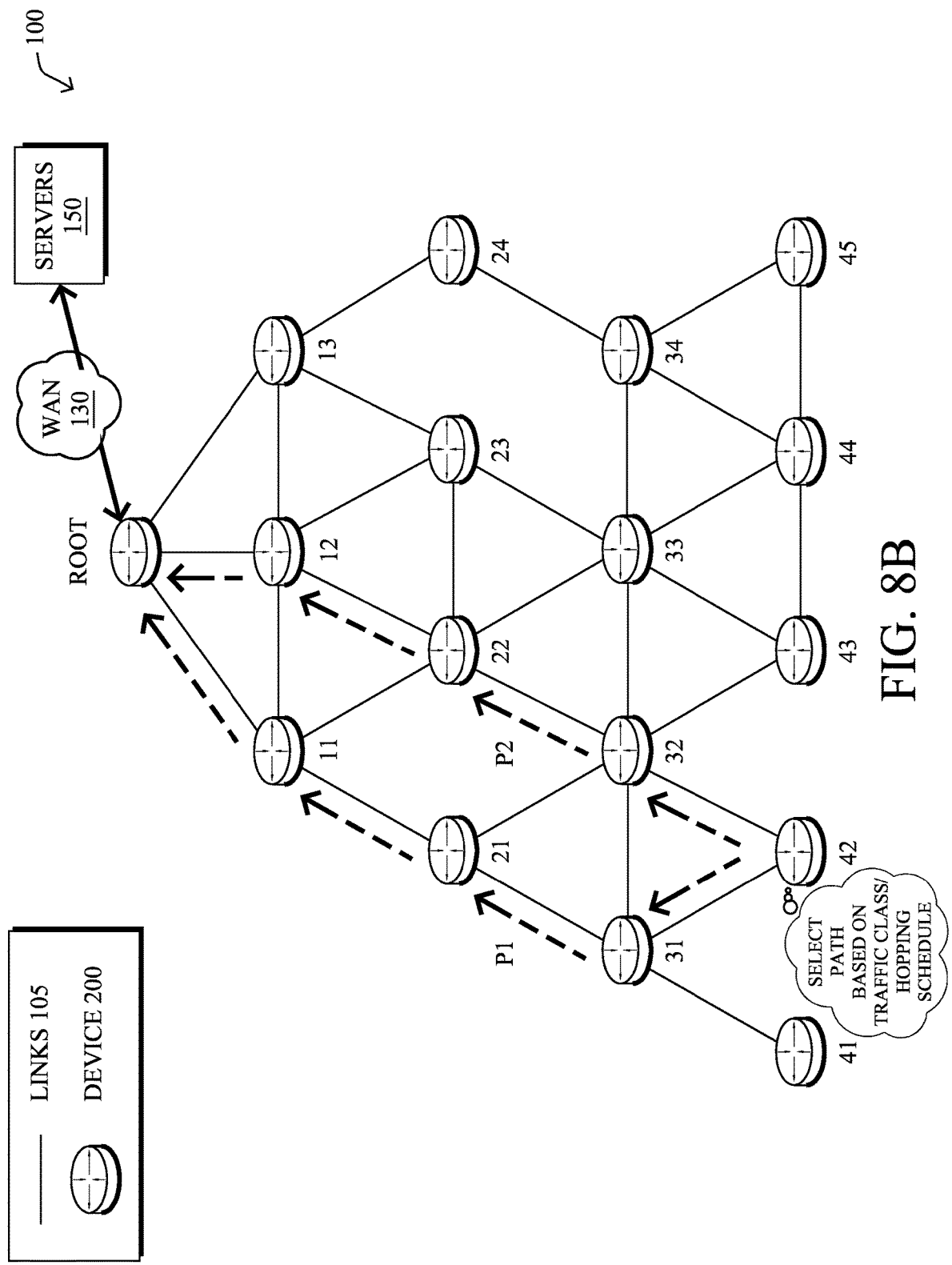

Referring now to FIGS. 8A-8B an example is shown of a node making a routing decision based on channel/traffic class assignments, according to various embodiments. In some embodiments, network nodes may be configured to maintain multiple next-hop routes for each destination. For example, as shown in FIG. 8A, node 42 may maintain a first path P1 to the FAR/Root (e.g., via node 31) and a separate path P2 to the FAR/Root (e.g., via node 32). In various cases, paths P1 and P2 may or may not overlap (e.g., path P2 may alternatively merge with path P1 at node 21, etc.). In cases in which a packet's traffic class limits the set of channels that may be used to transmit the packet at a given time, maintaining multiple next-hop routes enables diversity in the set of available channels on which the packet may be transmitted. Having this diversity allows the mesh device to minimize communication delays in waiting for an appropriate channel to become active to communicate traffic of a particular class.

In many cases, a device may have multiple next-hop choices that offer very similar path costs. The techniques herein add the consideration of traffic priority and current receiver channel into the next-hop selection. By allocating traffic class to different channels, the techniques herein effectively allocate channel capacity to different channel classes. In cases where there is little difference in path cost, switching next-hop destinations offers lower latency while giving more opportunity to maintain traffic within the channels allocated to it. For cases where the path cost differs greatly, the situation may be handled differently depending on the traffic class. For example, high-priority traffic may utilize low-priority channel with lower path cost. However, low-priority traffic may choose to wait until a low-priority channel is available.

A described above, each of nodes 31 and 32 may maintain different, independently calculated listen schedules. Thus, at any given time, node 42 may have the ability to communicate with node 31 on a first channel or with node 32 on a different channel. In various embodiments, as shown in FIG. 8B, node 42 may select which channel to send a particular packet based on the traffic class associated with the packet. For example, if the traffic class is assigned to a particular channel and node 31 is currently listening to that channel, node 42 may send the packet to the parent node 31 immediately. If both parents 31 and 32 are currently listening to high priority channels, node 42 may opt to send the traffic to its preferred parent (e.g., according to the primary DAG, e.g., according to one or more other metrics, as defined by an objective function).

In some cases, a channel assigned to a particular traffic class may not be available immediately from any of the parents/next-hops of a transmitting node. For example, assume that node 42 has high priority traffic to send to the FAR/Root node and that the class of the traffic is assigned to one or more specific channels. However, also assume that the channel hopping schedules of nodes 31 and 32 are such that the assigned high priority channel(s) are currently unavailable. Notably, even though a device may maintains multiple next-hop routes towards a destination, because channel-hopping schedules are effectively uncoordinated, it is possible for none of the receivers to be currently tuned to a channel allocated to the packet's traffic class. In such cases, according to various embodiments, the transmitting node may opt to send a packet using a lower priority channel set. For example, rather than waiting for either of the schedules of nodes 31 and/or 32 to hop to a channel assigned to the high priority traffic class, node 42 may elect to send the traffic immediately using one of the currently available, lower priority channels. At a later time, if a high-priority channel becomes available from either of nodes 31, 32, node 42 may switch to sending the traffic using the high-priority channel.

In one embodiment, a transmitting node implementing the techniques herein may evaluate each packet individually, to determine whether the next-hop should be changed midstream (e.g., an assigned/preferred channel becomes available for the traffic class). In another embodiment, it is possible to maintain the same next-hop for a given stream. For example, the next-hop may be selected based on the first packet and following packets may be forwarded through the same next-hop. However, delays may also be required if there is a need to wait for a slot (e.g., low-priority traffic in low-priority slot, etc.).

Of note is that multi-path delivery can cause issues in terms of widely varying end-to-end delays, packet ordering, etc. for a given packet stream and may affect end-to-end transport protocols such as TCP. Fortunately, the vast majority of traffic in Smart Grid AMI networks and similar network do not rely on TCP and are not typically stream-based. For example, meter read requests may take the form of a multicast request that indicate a time window that devices should generate a response. Each device then picks a random time within the response window and generates a response. The response window may also have a start time that occurs well into the future. For example, a typical read request may specify a time window between 12:00 AM and 4:00 AM.

Figure 9A:
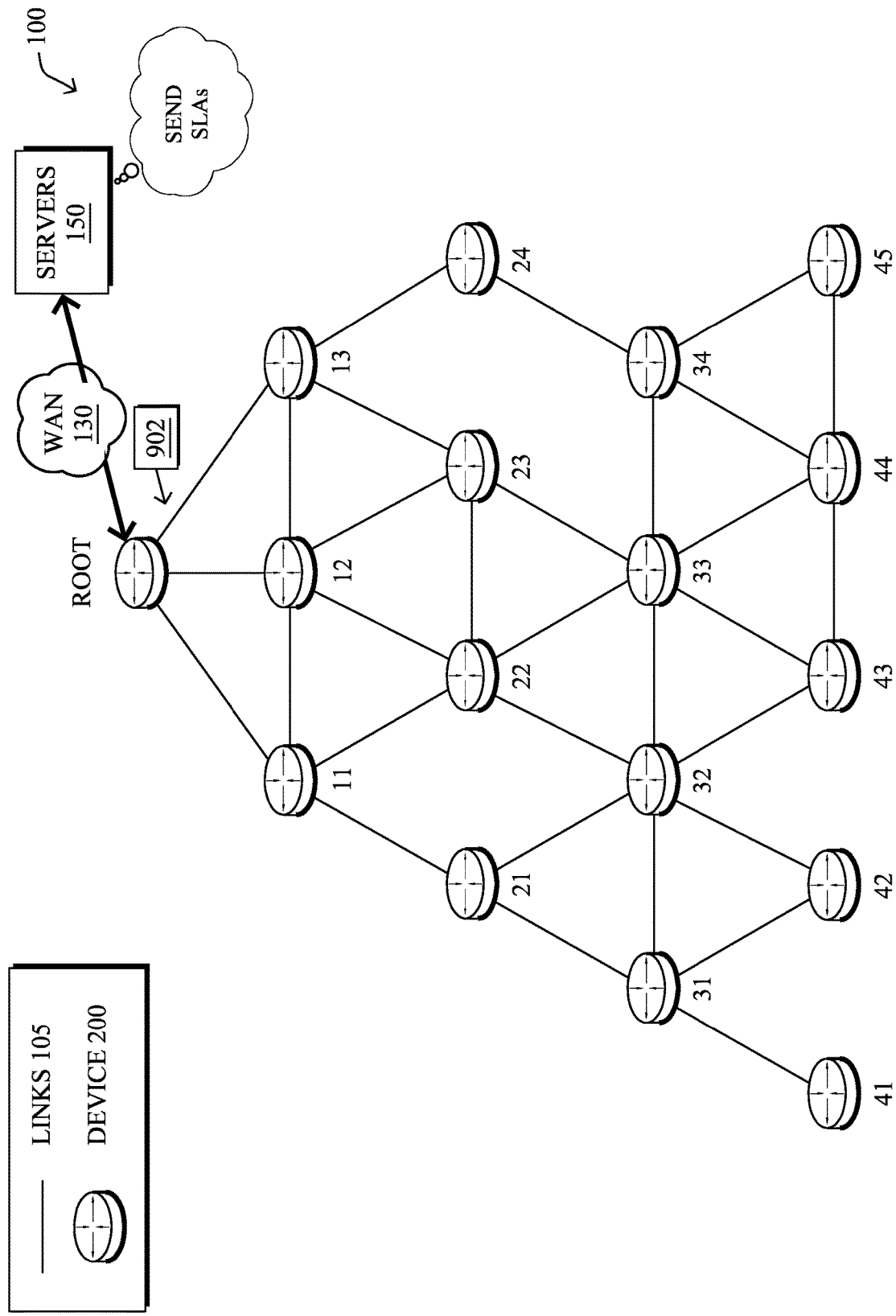
FIGS. 9A-9D illustrate examples of a control loop mechanism for channel assignment.

Referring now to FIGS. 9A-9D, examples of a control loop mechanism for channel assignment is shown, according to various embodiments. In some embodiments, the supervisory device that assigns traffic classes to channels may base the channel assignments on the specific application SLAs for the traffic classes. For example, as shown in FIG. 9A, the NMS may send SLA information 902 to the FAR/Root node via a newly defined IPv6 message (e.g., a CoAP message, etc.). SLA information 902 may include, but is not limited to, metrics such as delays, jitter, or any other metrics that the FAR/Root may use to dynamically tune the channel allocations on a per traffic class basis. In other words, SLA information 902 may define the guaranteed performance of the network required for a given traffic class (e.g., in terms of expected bandwidth, latency, etc.). In another embodiment, the NMS or user application may provide basic feedback (e.g., as opposed to a detailed SLA) to the FAR/Root on a per traffic class, to signal that a traffic class is not receiving proper resources.

Figure 9B:
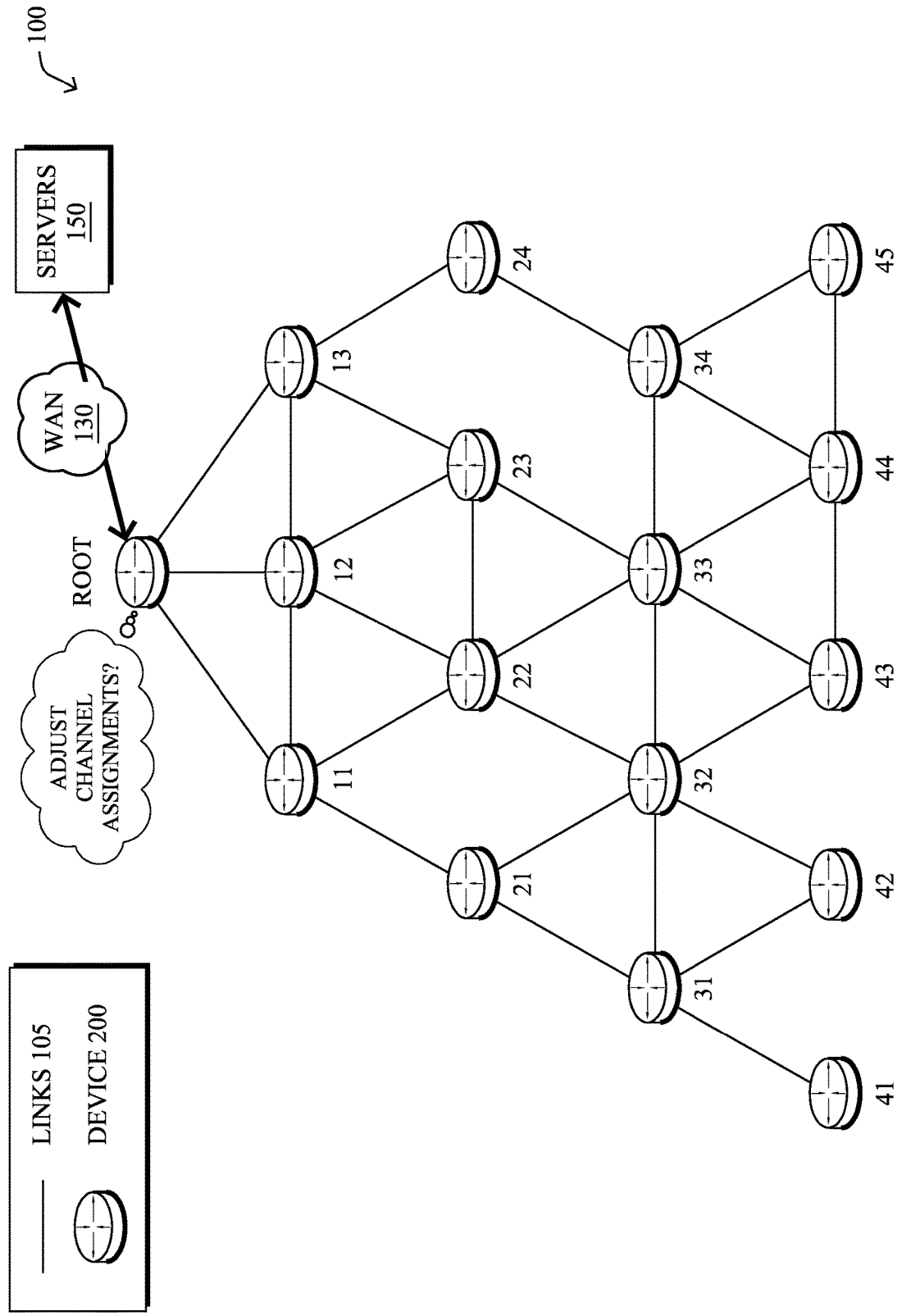
Figure 9C:
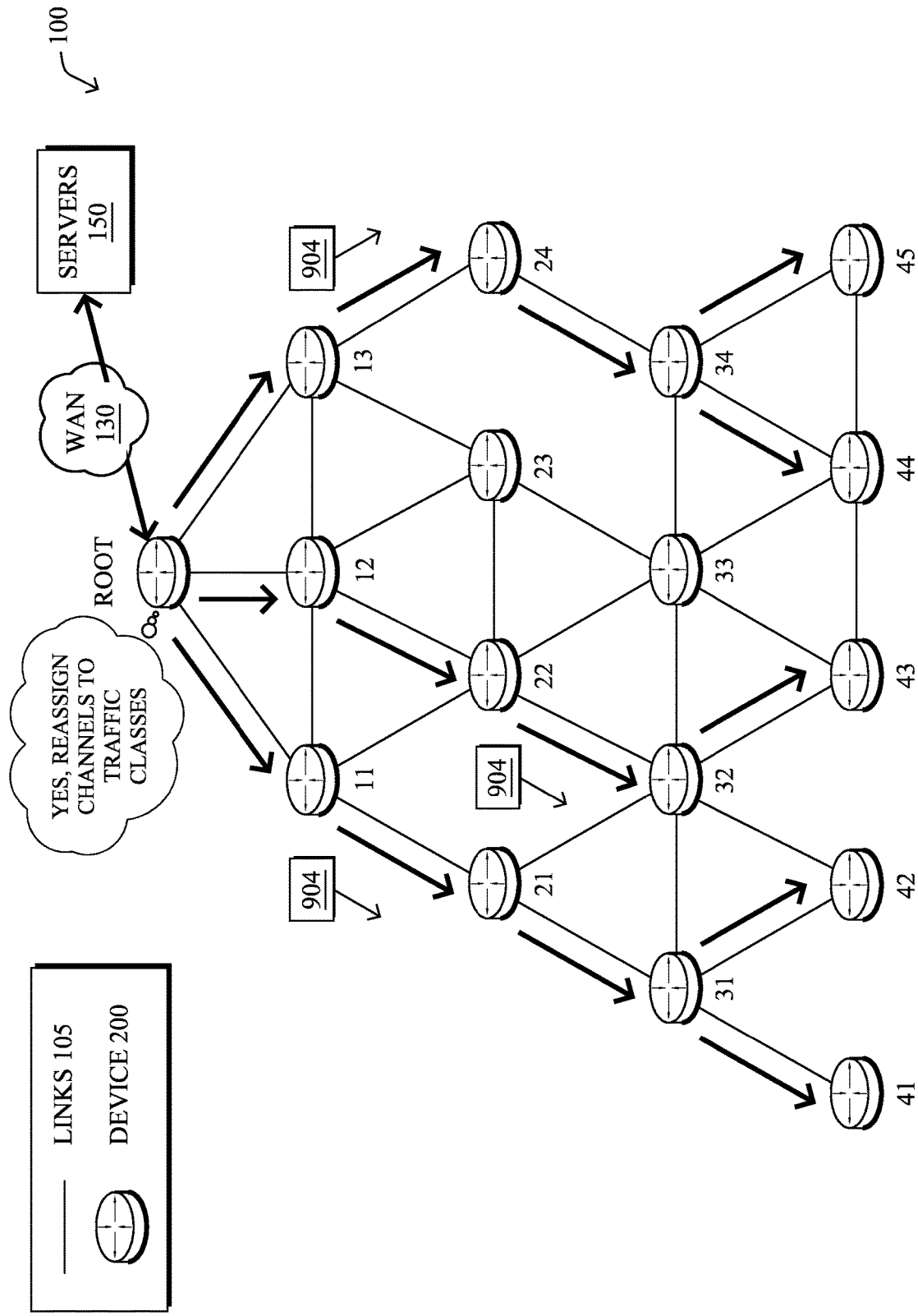

As shown in FIG. 9B-9C, the supervisory device may iteratively adjust the channel assignments to the traffic classes based on the performance of the assigned traffic classes in the network (e.g., whether traffic of a particular class satisfies its SLA, etc.). In one embodiment, the supervisory device may determine whether or not a reallocation of channels is needed by observing the amount of traffic flowing through a choke point (e.g., the FAR/Root, etc.). In another embodiment, the device may receive information regarding the amount of traffic that they are sending for one or more of the traffic classes (e.g., as part of metrics 702). In yet another embodiment, mesh devices may provide indicators for the channel utilization (e.g. CCA failures, missed ACKs, etc.) to the supervisory device. In another embodiment, the FAR/Root may be configured to use deep packet inspection, to detect packet retransmissions (e.g., if the applications make use of TCP or RTP as the transport), without having to gather link-local statistic from nodes in the networks (e.g., the CCA failures, NACKs, etc.). Using this information, the supervisory device may choose to change the channel assignments for the traffic classes (e.g., by adding more/less channels, changing the set of channels, etc. to a different traffic classes).

As would be appreciated, the iterative process of evaluating the effects of channel allocations to traffic classes and reassigning channels may be performed with minimal traffic overhead in the mesh network. Notably, traffic in the network will typically flow through the FAR/Root node, allowing the Root node to monitor the traffic flows without generating additional traffic. In addition, any traffic between the FAR/Root and an NMS may be sent via WAN 130, meaning that this traffic will not traverse or affect nodes 11-45. In other words, in various cases, all information that may be used to (re)adjust channel assignments to traffic classes (e.g., SLA requirements, the current traffic matrix, etc.), may be collected without any additional traffic in the LLN.

If the supervisory device determines that a reallocation/reassignment of the traffic classes is needed (e.g., based on its collected information), it may send instructions 904 to the affected nodes, as depicted in FIG. 9C. Instructions 904 may include the updated channel assignments and cause a transmitting node to adjust how it forwards data in the network. For example, the updated channel assignments may cause node 41 to adjust how it sends high priority traffic, in a manner similar to instructions 704.

Figure 9D:
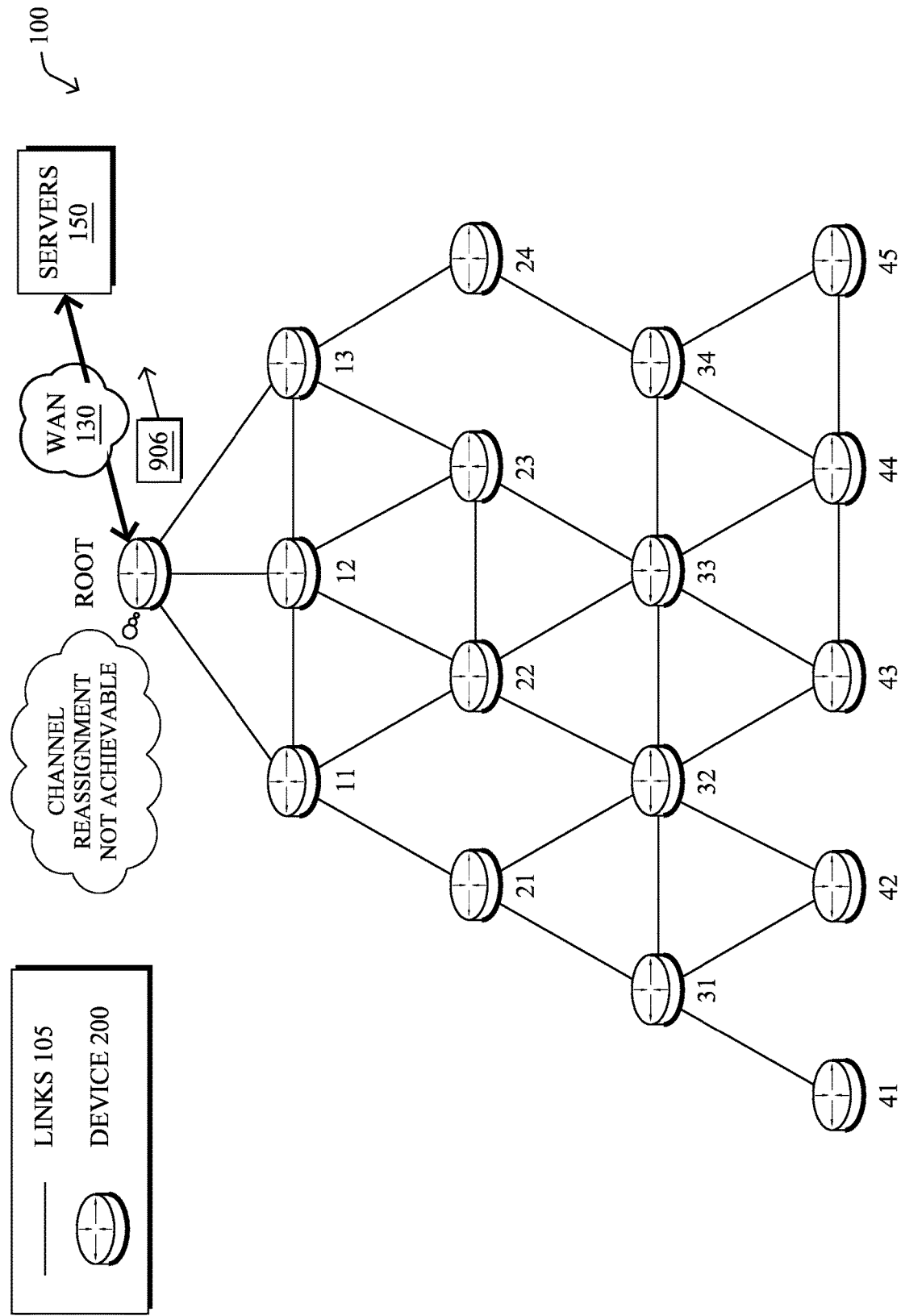

In some cases, a channel reassignment may be initiated by a request for channel reallocation. For example, a particular application (e.g., an application associated with a particular class of traffic) or the NMS may request that the FAR/Root assign more channels to the traffic class. If the FAR/Root determines that the impact of such an assignment will not impinge on other traffic classes, it may implement the reassignment. However, if the FAR/Root determines that it cannot allocate more channels to a traffic class without rising affecting the quality of service (QoS) of another class, it may provide an indication 906 back to the NMS, or other requesting device, indicating that the channel reassignment is not achievable, as shown in FIG. 9D.

The techniques herein may be applied to any number of different channel plans. For example, different geographical regions may offer different channel plans. However, the number of channels in a given plan simply affects to what granularity the available bandwidth across all channels can be divided between traffic classes. In a plan that offers X channels, the minimum granularity of allocation is 1/X. Reduced number of channels increases the minimum chunk of available bandwidth that may be allocated to high or low-priority slots. For example, in a channel plan with only 4 channels, ¼ of the channels may be allocated to high-priority, but nothing smaller. Without any change to the channel sequence (e.g., channel IDs are chosen with IID distribution), then this also indicates that (on average) ¾ of the time will be allowed for low-priority traffic. In other words, latency for low-priority traffic may increase compared to an allocation that allows for fewer slots allocated to high-priority. However, it is possible to compensate for this by changing the channel sequence such that low-priority slots occur more frequently than high-priority slots.

As described above, higher priority channels are given preferential treatment because they are likely to have less contention than lower-priority channels. When feedback on channel conditions is included in the channel allocation, the high-priority channels are also more likely to provide better channel characteristics. Recall that high-priority traffic may also utilize low-priority channels, in some embodiments. As a result, low-priority channels can have higher contention since both low and high-priority traffic are contending for the low-priority channel. In some embodiments, channel assignments may be made to allocate enough of the available bandwidth to satisfy the application requirements for high-priority traffic. In some cases, the margin of capacity may be higher where the high-priority traffic being supported is critical. In other cases, the high-priority traffic may be capped to reduce the overall effect on low-priority traffic. In many cases, the fraction of available bandwidth allocated to high-priority traffic may be less than that for low-priority traffic.

Figure 10:
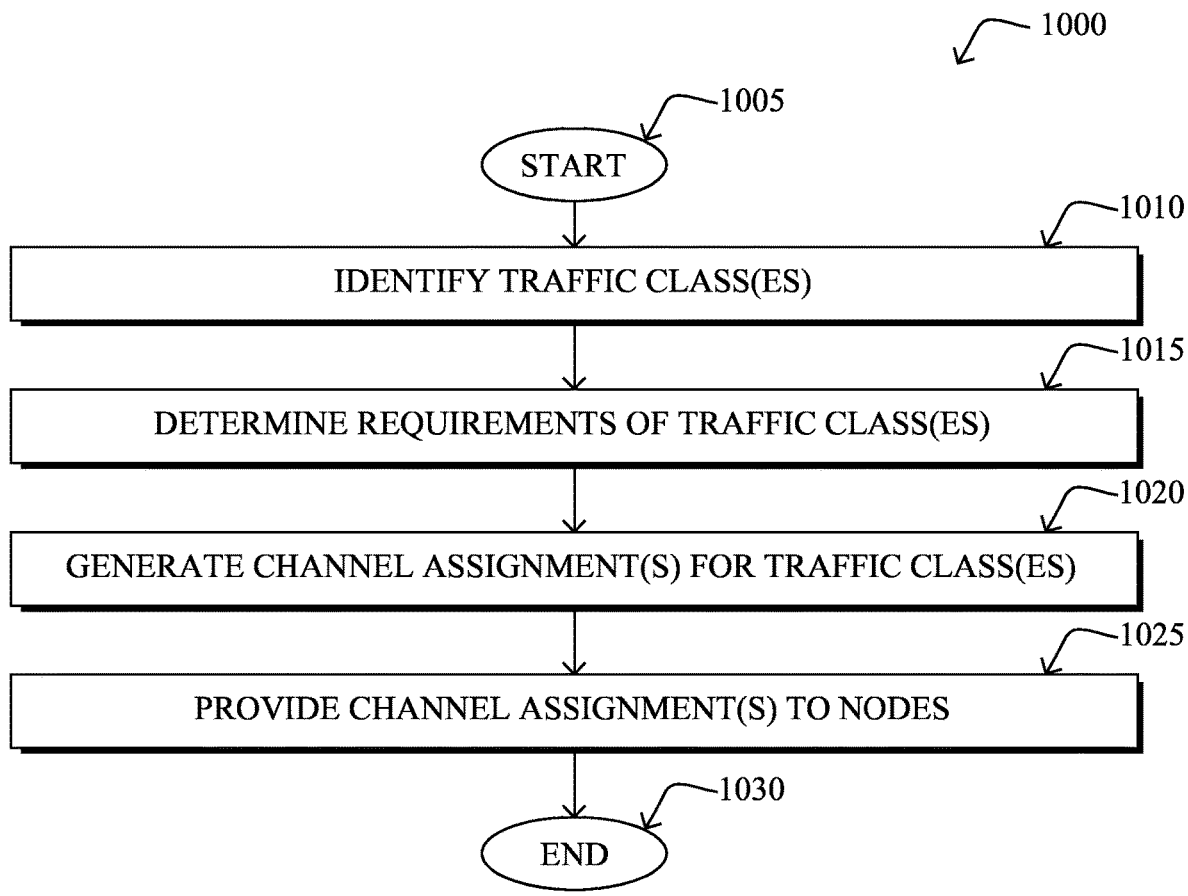
FIG. 10 illustrates an example simplified procedure for assigning a traffic class to a particular channel.

FIG. 10 illustrates an example simplified procedure for assigning a traffic class to a particular channel in a network, in accordance with one or more embodiments described herein. In general, procedure 1000 may be performed by a network device (e.g., device 200) that acts in a supervisory capacity in the network for purposes of assigning channels to different traffic classes (e.g., a FAR/Root node, an NMS, etc.). Procedure 1000 may start at step 1005 and continue on to step 1010 where, as described in greater detail above, the device identifies one or more traffic classes. In various embodiments, a traffic class may correspond to a particular application that generates the traffic and/or a particular type of message. For example, distributed automation (DA) messages within the network may belong to a high-priority class, since DA control messages may require certain guarantees regarding when the control messages will be delivered to a controlled device.

At step 1015, as detailed above, the device determines the routing requirements of the one or more traffic classes. In some embodiments, the routing requirements may correspond to a minimum bandwidth required for a traffic class and/or latency requirements of the traffic class. In other embodiments, the routing requirements may correspond to a required link/channel quality for a given traffic class. For example, a high-priority class of traffic may require using links that guarantee delivery within a certain range. In some embodiments, the routing requirements of a traffic class may correspond to an SLA that is used to guarantee a certain degree of performance by the network for the traffic class (e.g., in terms of delay, jitter, etc.).

At step 1020, the device generates one or more channel assignments for the one or more traffic classes, as detailed above. Such a channel assignment may assign a particular traffic class to a particular channel or set of channels used for communication in the network. In various embodiments, the channel assignment may be based on the routing requirements of the traffic class. For example, the traffic class may be assigned to any number of different channels, such that its bandwidth requirements are satisfied in the network. In another embodiment, the traffic class may be assigned to one or more channels based on link quality metrics (e.g., RSSI measurement, ETX measurements, etc.) and/or noise floor metrics collected by the device from nodes in the network. In further embodiments, a channel assignment to a traffic class may be based on observations regarding the performance of the corresponding traffic under an existing assignment. For example, the supervisory device may perform deep packet inspection on the traffic, to determine how well the current assignment is performing. In a further embodiment, the channel assignment may be prompted by a request for additional channels (e.g., by an application, an NMS, etc.).

At step 1025, the device provides the one or more channel assignments to node(s) in the network, as described in greater detail above. In some embodiments, the channel assignments may be provided via any existing form of multicast message (e.g., Enhanced Beacons, etc.). Notably, the assignments may be provided network-wide or, alternatively, to only a subset of the network. For example, nodes that are all within the same interference domain may be provided the channel assignments. In various embodiments, any node that receives the channel assignments may use the assignments to route traffic of the particular traffic class. Notably, if a channel in use by a preferred parent of the node is assigned to the traffic class, the node may send the traffic belonging to the class to the parent. In some embodiments, the node may also be configured to use alternative channels (e.g., a channel in use by an alternative parent/next-hop, a lower-priority channel, etc.), if the channels currently used by its neighbors are not assigned to the traffic class. Procedure 1000 then ends at step 1030. However, as would be appreciated, some or all of the steps of procedure 1000 may be repeated in an iterative manner to adjust the channel assignments for the traffic classes, as desired.

Figure 11:
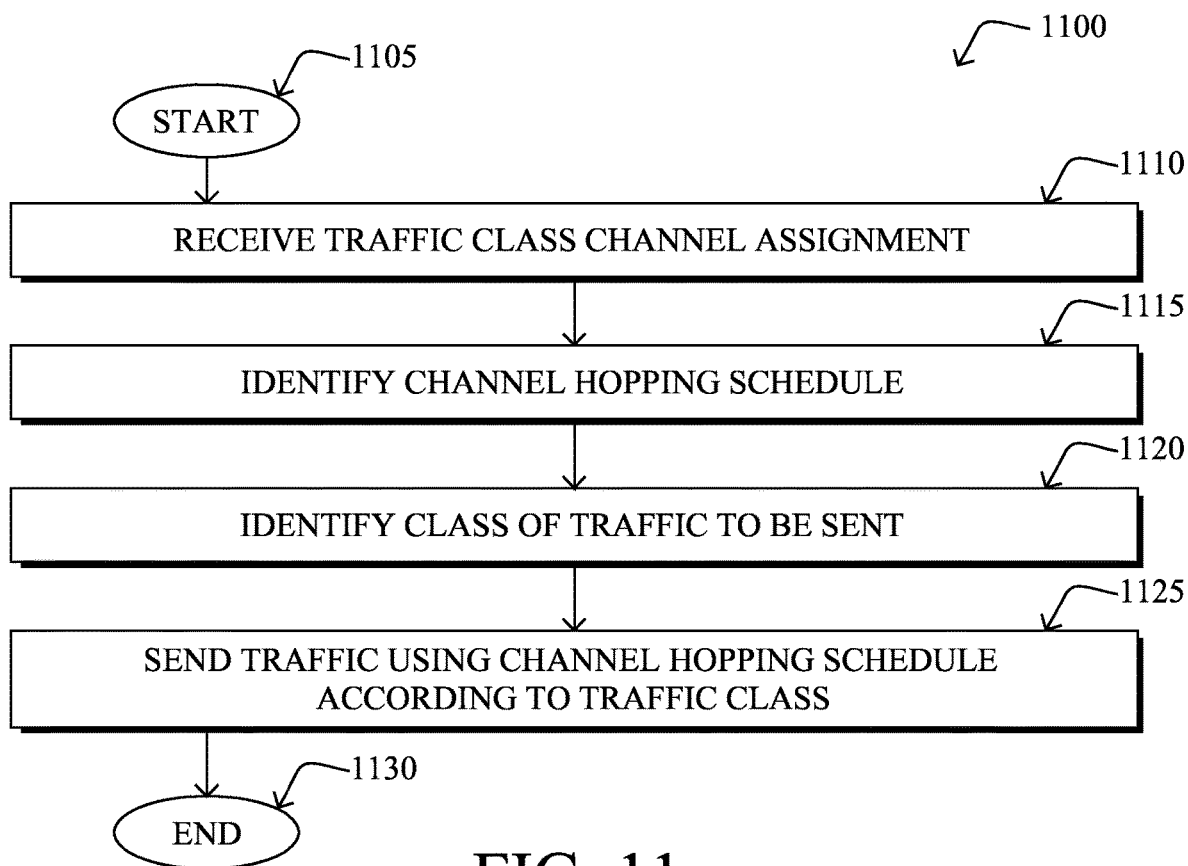
FIG. 11 illustrates an example simplified procedure for sending traffic based on a traffic class.

FIG. 11 illustrates an example simplified procedure for sending traffic based on a traffic class in a network, in accordance with one or more embodiments herein. In general, procedure 1100 may be performed by any node/device (e.g., node 200) in a network that is configured to route or otherwise transmit data to another node/device in the network. Procedure 1100 begins at step 1105 and continues on to step 1110 where, as described in greater detail above, the node receives a channel assignment that assigns a particular traffic class to one or more communication channels/frequencies. For example, a node in an LLN may receive a channel assignment from a supervisory device (e.g., a FAR/Root node, an NMS, etc.).

At step 1115, the node identifies one or more channel hopping schedules that may be used to communicate with the node's neighbors, as described above. In various embodiments, each node in the network may be responsible for generating its own receive schedule in a distributed manner throughout the network (e.g., channel hopping schedules are not assigned centrally). Typically, the selected channel hopping schedules may provide both frequency and time diversity, allowing nearby sender-receiver pairs to communicate at the same time using different channels.

At step 1120, the node identifies a traffic class for traffic to be sent by the node, as detailed above. In some cases, the node may be the originator of the traffic. In other cases, the node may act as a router in the network, thereby forwarding the traffic on behalf of another node towards a destination. Traffic classes may generally correspond to different applications or message types that may be sent within the network. For example, power outage and power restoration messages may be assigned a high-priority traffic class, to keep a utility informed about power outage events in the network.

At step 1125, the node sends the traffic using one of the channel hopping schedules and based on the identified traffic class, as described in greater detail above. For example, if the traffic class is assigned to a channel currently in use by the node's next hop, the node may send the traffic. In some embodiments, the node may maintain alternate paths to a destination, thereby allowing the node to select between neighbors/next-hops based on their corresponding channel hopping schedules. In particular, if one of the node's next-hops is using the assigned channel, the node may elect to send the traffic to that next-hop. In some embodiments, if the channels in use by the next-hops are not assigned to the traffic class, the node may still elect to send the traffic to one of the next-hops. For example, in some cases, the node may send higher priority traffic using a low-priority channel. Procedure 1100 then ends at step 1130.

Figure 12:
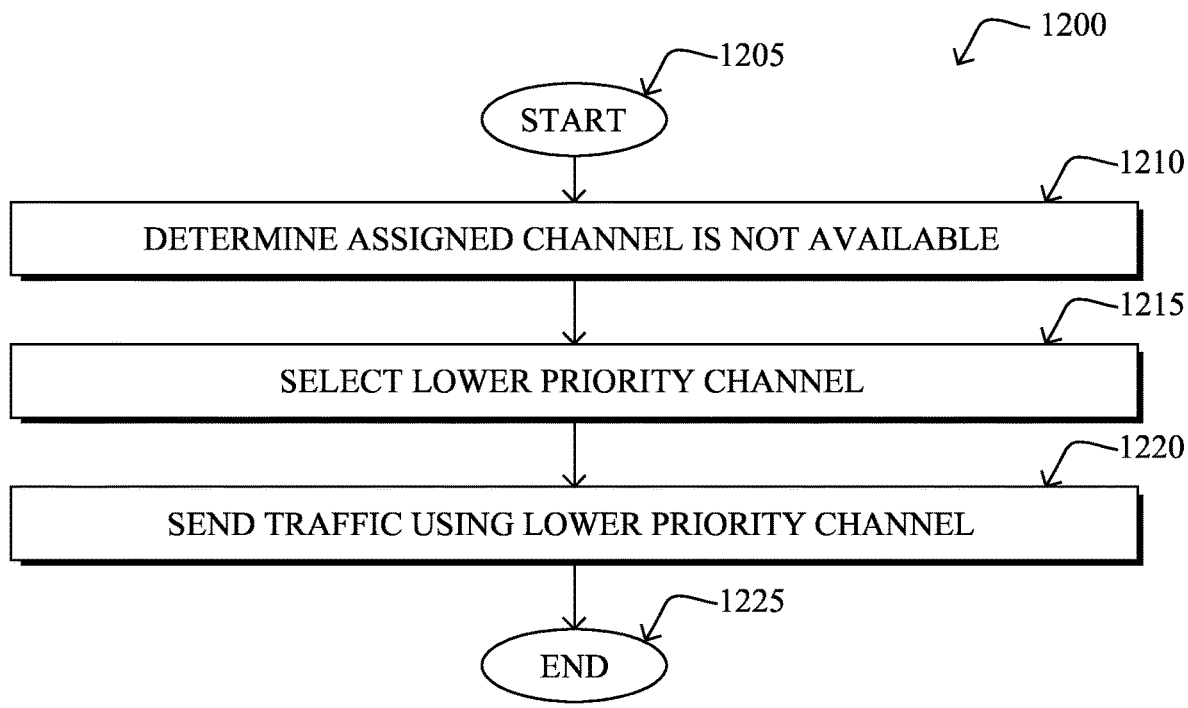
FIG. 12 illustrates an example simplified procedure for sending high priority traffic using a lower priority channel.

FIG. 12 illustrates an example simplified procedure for sending high priority traffic using a lower priority channel, in accordance with one or more embodiments herein. Procedure 1200 may start at step 1205 and continue on to step 1210 where, as described in greater detail above, a node in a network may determine that a channel or set of channels assigned to a particular traffic class is not currently available for use by the node's neighbor(s). For example, assume that only 25% of the channels used by a particular next-hop neighbor of the node are assigned to high-priority traffic classes. In such a case, these channels will not be available 75% of the time for use when transmitting data.

At step 1215, as detailed above, the node selects a lower priority channel from among the channel hopping schedule (s) of its neighbor(s). In particular, even if a high priority channel is not currently available (e.g., the channels in use by the node's neighbors are not assigned to high priority traffic classes), the node may still elect to send the traffic using one of the available, low-priority channels. If the node maintains multiple paths to a destination, and only low-priority channels are currently available at the next-hops, the node may choose between paths based on the paths' characteristics (e.g., according to a path's metrics and/or an objective function used to form the path).

At step 1220, the node sends the high-priority traffic via the selected, low-priority channel, as detailed above. Notably, certain types of traffic may be such that it is undesirable to wait for a high-priority channel to become available, before sending the traffic. If, at a later time, the high-priority channel becomes available, the node may also begin to use that channel, as needed. Procedure 1200 then ends at step 1225.

It should be noted that while certain steps within procedures 1000-1200 may be optional as described above, the steps shown in FIGS. 10-12 are merely examples for illustration and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1200 are described separately, certain steps from each procedure may be incorporated into each other procedure, and the procedures are not meant to be mutually exclusive.

The techniques described herein, therefore, provide for traffic class capacity allocation in computer networks. In particular, the techniques herein effectively allocate network capacity to different traffic classes without significantly affecting the communication latency. Allocating channel sets to different traffic classes guarantees channel access to higher-priority traffic and does not suffer from the hidden-terminal problem.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a node in a network, a channel assignment for a particular traffic class that assigns the particular traffic class to a particular channel;
   identifying, by the node, a plurality of channel hopping schedules to communicate with a plurality of neighbors of the node;
   identifying, by the node, a traffic class of traffic to be sent by the node as matching the particular traffic class;
   maintaining, by the node, a first path from the node to a destination node in the network and a second path from the node to the destination node, the first path including at least a first neighbor of the node, and the second path including at least a second neighbor of the node different from the first neighbor;
   determining, by the node, whether to send the traffic along the first path to the first neighbor or along the second path to the second neighbor based on an identification of whether the first neighbor or the second neighbor is listening to a channel assigned to the traffic class of the traffic according to the received channel assignment, a channel hopping schedule of the first neighbor, and a channel hopping schedule of the second neighbor; and
   sending, by the node, the traffic along the determined first or second path via the channel assigned to the traffic class of the traffic.

2. The method as in claim 1, further comprising:
   determining, by the node, that the particular channel is not currently available in the plurality of channel hopping schedules; and
   selecting, by the node, a different channel than the particular channel as the channel via which the traffic is to be sent.

3. The method as in claim 2, wherein the different channel has a lower priority than the particular channel.

4. The method as in claim 2, wherein the first and second neighbors are associated with different channels.

5. The method as in claim 1, further comprising:
   providing, by the node, link quality metrics for the particular channel, wherein the channel assignment is based on the link quality metrics.

6. The method as in claim 1, further comprising:
   receiving, at the node, a channel reassignment that reassigns the particular traffic class to a different channel than the particular channel.

7. An apparatus, comprising:
   one or more network interfaces to communicate with a computer network;
   a processor coupled to the one or more network interfaces and configured to execute a process; and
   a memory configured to store the process executable by the processor, the process when executed operable to:
   receive a channel assignment for a particular traffic class that assigns the particular traffic class to a particular channel;
   identify a plurality of channel hopping schedules to communicate with a plurality of neighbors of the apparatus;
   identify a traffic class of traffic to be sent by the apparatus as matching the particular traffic class;
   maintain a first path from the apparatus to a destination node in the network and a second path from the apparatus to the destination node, the first path including at least a first neighbor of the apparatus, and the second path including at least a second neighbor of the apparatus different from the first neighbor;
   determine whether to send the traffic along the first path to the first neighbor or along the second path to the second neighbor based on an identification of whether the first neighbor or the second neighbor is listening to a channel assigned to the traffic class of the traffic according to the received channel assignment, a channel hopping schedule of the first neighbor, and a channel hopping schedule of the second neighbor; and
   send the traffic along the determined first or second path via the channel assigned to the traffic class of the traffic.

8. The apparatus as in claim 7, wherein the process when executed is further operable to:
   determine that the particular channel is not currently available in the plurality of channel hopping schedules; and
   select a different channel than the particular channel as the channel via which the traffic is to be sent.

9. The apparatus as in claim 8, wherein the different channel has a lower priority than the particular channel.

10. The apparatus as in claim 7, wherein the first and second neighbors are associated with different channels.

11. The apparatus as in claim 10, wherein the process when executed is further operable to:
    provide link quality metrics for the particular channel, wherein the channel assignment is based on the link quality metrics.

12. The apparatus as in claim 7, wherein the process when executed is further operable to:
    receive a channel reassignment that reassigns the particular traffic class to a different channel than the particular channel.

13. A tangible, non-transitory, computer-readable media having software encoded thereon, the software when executed by a processor on a device in a computer network operable to:
    receive a channel assignment for a particular traffic class that assigns the particular traffic class to a particular channel;
    identify a plurality of channel hopping schedules to communicate with a plurality of neighbors of the device;
    identify a traffic class of traffic to be sent by the device as matching the particular traffic class;
    maintain a first path from the device to a destination node in the network and a second path from the device to the destination node, the first path including at least a first neighbor of the device, and the second path including at least a second neighbor of the device different from the first neighbor;
    determine whether to send the traffic along the first path to the first neighbor or along the second path to the second neighbor based on an identification of whether the first neighbor or the second neighbor is listening to a channel assigned to the traffic class of the traffic according to the received channel assignment, a channel hopping schedule of the first neighbor, and a channel hopping schedule of the second neighbor; and send the traffic along the determined first or second path via the channel assigned to the traffic class of the traffic.

14. The tangible, non-transitory, computer-readable media as in claim 13, wherein the process when executed is further operable to:

determine that the particular channel is not currently available in the plurality of channel hopping schedules; and select a different channel than the particular channel as the channel via which the traffic is to be sent.

15. The tangible, non-transitory, computer-readable media as in claim 14, wherein the different channel has a lower priority than the particular channel.

16. The tangible, non-transitory, computer-readable media as in claim 13, wherein the wherein the first and second neighbors are associated with different channels.

17. The tangible, non-transitory, computer-readable media as in claim 16, wherein the process when executed is further operable to:

provide link quality metrics for the particular channel, wherein the channel assignment is based on the link quality metrics.

18. The tangible, non-transitory, computer-readable media as in claim 13, wherein the process when executed is further operable to:

receive a channel reassignment that reassigns the particular traffic class to a different channel than the particular channel.

* * * * *